United States Patent [19]
Principe et al.

[11] 3,817,108
[45] June 18, 1974

[54] GAS SAMPLING APPARATUS AND METHOD

[75] Inventors: Andrew H. Principe, Mundelein; Emmett P. Glynn, Lemont, both of Ill.

[73] Assignee: Cand-Aire Industries, Inc., Highland Park, Ill.

[22] Filed: Sept. 5, 1972

[21] Appl. No.: 286,268

[52] U.S. Cl. ............... 73/421.5 R, 73/1 R, 128/2 C
[51] Int. Cl. ............................................ G01n 1/24
[58] Field of Search ............ 73/1 R, 421.5 R, 425.6; 128/2 C; 137/525

[56] References Cited
UNITED STATES PATENTS
2,473,912   6/1949   Schwinn ............................ 137/525
3,618,393   11/1971  Principe et al. .................... 73/421.5

OTHER PUBLICATIONS
Analytical Chemistry, Vol. 31, No. 11, November 1959, Page 1925.
Henderson Journal of Physics E: Scientific Instruments, 1970, Vol. 3, pp. 984–986.

*Primary Examiner*—S. Clement Swisher
*Attorney, Agent, or Firm*—Gary, Juettner, Pigott & Cullinan

[57] ABSTRACT

Apparatus for taking and storing gaseous samples for subsequent analysis, such as alveolar air of humans for quantitative analysis for suspect constituents of the breath, for example breath alcohol. A partially evacuated canister has a valved inlet connected to a tube through which the gas sample is taken. The tube is composed of a flexible material and has a longitudinal slit therein forming a one way valve, which opens under internal pressure and closes when vacuum is applied from the canister through the tube. The canister has a depressed area in the top around the valve, said area containing a self-sealing composition, which permits puncture of the container and hypodermic extraction of a sample without tampering or contamination.

A particular feature resides in the injection of a standard or tracer within the canister whereby an extracted specimen of the sampled gas may be compared simultaneously on a gas chromatograph or other suitable instrument with the known standard to provide immediate quantitation of the proportion of suspect constituent in the sample.

11 Claims, 4 Drawing Figures

3,817,108

PATENTED JUN 18 1974

3,817,108

GAS SAMPLING APPARATUS AND METHOD

BACKGROUND OF THE INVENTION

It is known that a proportion of ingested ethyl alcohol is excreted in the breath. Alcohol in alveolar air is in equilibrium with that in the pulmonary capillary blood, and this physiological fact allows the results of breath analysis to be used as an indicator of blood-alcohol levels. The principle has attained significant acceptance with law enforcement agencies and courts as an excellent evidentiary aid. Various sampling and measuring instruments have been employed to measure breath-alcohol concentration.

One such device is described in our U.S. Pat. No. 3,618,393, incorporated herein by reference. The device described therein comprises an evacuated canister having an inlet controlled by a valve, a sample tube connected to the inlet through which the air or gas sample is drawn, and a one-way pressure relief valve accommodating exhaust of air from said tube. In use, the person being tested exhales into the open end of the sample tube to exhaust mouth and upper lung air through the pressure relief valve. Near the end of exhalation, the operator opens the canister valve, so that a representative sample of alveolar or deep lung air is drawn into the canister.

The sample thus taken may be tested for breath alcohol or other selected constituents of human breath. Also, the evacuated canister may be utilized for sampling other gases, such as process gases used and/or formed in commercial production, waste and polluting gases, etc.

The combination of canister and tube affords substantial advantage because of its portability, reliability and inherent simplicity. Use of the sampling device does not require a great deal of skill, samples may be taken at any location, and the contained samples may be transported to a separate facility for analysis. Since each canister may have a fixed volume and a fixed degree of evacuation, the samples taken are highly accurate and reliable and may be analyzed utilizing various known quantitative techniques, such as gas chromatography.

SUMMARY OF THE INVENTION

The present invention provides improvements over the device described in our U.S. Pat. No. 3,618,393, in terms particularly of reliability, and ease of use.

According to this invention, the vacuum in the canister is fixed at a value sufficient to obtain a reliable sample adequate for repetitive testing, but not so large that condensation would occur in the canister at ambient temperatures, which would aversely affect the reliability of the sample.

Second, the canister is designed and evacuated to accommodate injection into the canister of an internal standard such that a sample may be compared simultaneously on a gas chromatograph to the known standard to provide immediate quantitation of the proportion or concentration of the suspect constituent in the sample.

Other improvements include a sample tube composed of a flexible material and having a slit therein which serves the function of the aforesaid one-way exhaust valve. The integrity of the contained sample is maintained by a mass of self-sealing material in a depression at the top of the container, through which the canister must be tapped with a punch to allow hypodermic injection of the known standard and withdrawal of samples. Means are also provided for securing the valve stem against tampering after the sample has been taken.

THE DRAWINGS

DETAILED DESCRIPTION

Figure 1:
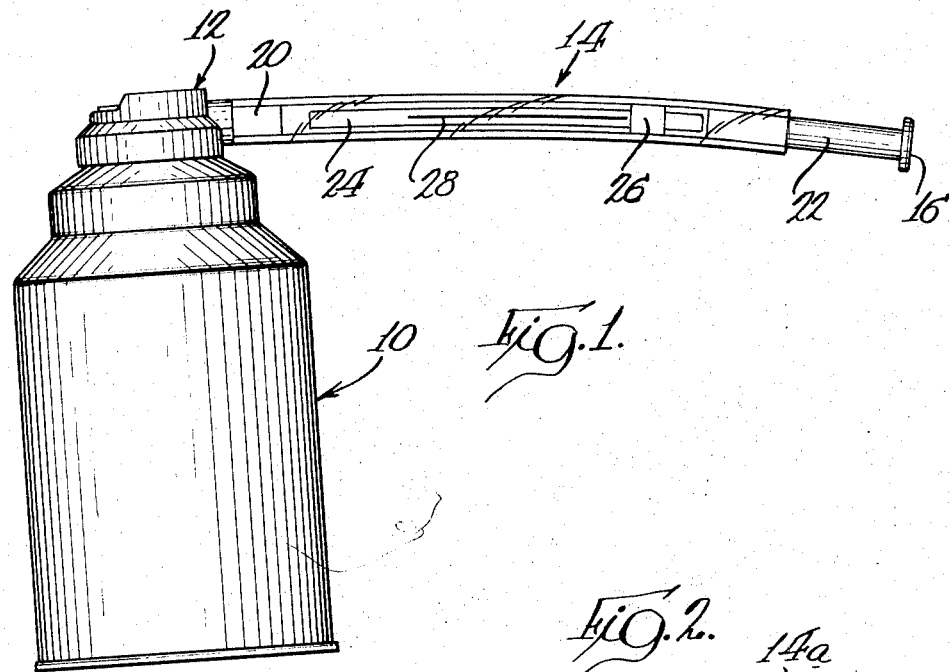
FIG. 1 is an elevational view of the device of the invention illustrating the combination of an evacuated canister and a sample tube having a one-way exhaust valve therein.

Referring to FIG. 1, the apparatus of the invention comprises a partially evacuated canister 10 having a valved inlet fitting 12 to which is connected a sample tube 14 having an open enlarged end 16. The canister may be any selected vessel or container conveniently and economically available, such as a glass, cardboard, plastic or metal container capable of being partially evacuated and of sufficient strength to withstand handling and shipment. A disposable metal aerosol container, as shown, has been found to be highly suitable for this purpose.

The aerosol container shown comprises a metal body equipped at the top with a valve 18 (FIG. 4) for establishing communication between the interior of the container 10 and an inlet 20 in the valve fitting 12, the valve being spring loaded to a normally closed position and adapted to be opened by a conventional finger operated button on the fitting 12. The interior of the container may comprise or be coated with an inert material, such as plastic, to prevent reaction with and contamination of gas sample to be taken.

In preparing the canister 10 for use, the interior thereof is first charged with nitrogen or another inert gas, followed by partial evacuation. In this manner, a gas sample subsequently drawn into the canister will be diluted in an inert medium without fear of contamination or reaction. The canister preferably has sufficient volume to allow collection of a gas sample adequate for withdrawal of two or more test specimens for analysis, so that verification of an initial test can be effected if necessary.

The degree of evacuation of the canister 10 is an important feature of the present invention. It will be recognized that the degree of evacuation determines the volume of the sample taken in a given size canister, and heretofore, the degree of evacuation has been believed to be non-critical, dependent only upon sample size. We have found that the degree of evacuation is a very important factor in terms of sample reliability, especially of moist gases such as human breath. Too great a vacuum in a fixed volume canister will result in a relatively large sample per unit of volume in the canister, with the possibility that less volatile constituents of the gas will condense to a liquid and thereafter absorb more volatile material such as ethanol.

In order to take, retain, and provide a sample of any material in the vapor state displaying a vapor pressure, it has been found that a number of influences are at play. These influences must be brought under control in the use of the sampling device to insure reliability of the analytical results.

The proper choice of vacuum level in the sample can will provide cautions within the can which will maintain the gaseous sample in a stable state and accommodate the introduction of an internal standard in a reliable manner.

Each material subject to sampling may be found to have a characteristic vapor saturation curve which under normal ambient conditions of temperature and pressure tends to vary its concentration and may even condense with consequent loss to the sampling technican. Should this occur in a sampling device, the gaseous sample will no longer be representative and the condensate may selectively or grossly extract multicomponent vapors in such a way as to lead the analyst astray. The choice of vacuum level overcomes these difficulties.

The use of an internal standard resides in the introduction into the canister of a known amount of a compound or element which is similar in chromatographic characteristic to the material to be analysed. The standard thus establishes a constant proportional relationship between a known and an unknown which will appear side by side in the output of a gas chromatograph, thereby to provide quantitation of the gaseous unknown. In the case of our sampling apparatus, an internal standard of a desired concentration is inserted into the can by injection and then upon withdrawal of a test specimen for analysis we can simultaneously analyze the unknown sample and the known standard in a single injection into the gas chromatograph. The proper choice of vacuum in the sample can acts to protect the integrity of the internal standard. This is done by liquid measurement of a solvent diluted standard for accuracy and vaporizability in relation to the environment in the sample can.

Thus, higher vacuums in the sample can may accept larger samples of the gaseous vapor to be analyzed, but if the larger sample is held in an unstable state with respect to its temperature and pressure characteristics, the largeness of the sample may lose its value. Further if the internal standard will not be accommodated by the can and its contents, the advantages of this technique will not be attained.

In practice we have found that the vacuum level chosen is determined by the class of materials to be tested, the temperature-pressure saturation curves of these materials, the type, concentration and method of introduction of an internal standard, and the interaction of the temperature-pressure saturation curve of the internal standard as introduced into the can. To achieve these conditions, the vacuum may vary by choice from a few mm of mercury to a maximum of just less than 30 inches of mercury.

For the sampling of human breath to accommodate testing for breath alcohol, we prefer to use a canister having a volume in the order of about 370 cc, evacuated to no more than about 15 and preferably about 10 inches of mercury, and having a residual atmosphere comprising inert gas, preferably nitrogen. In a volume of 370 cc, the amount of water in saturated air (breath) is 135 mg at 95° F (breath temperature) and about 45 mg at 60° F (a temperature slightly lower than the minimum temperature at which tests would be conducted). To prevent the occurrence of condensation at the temperatures at which tests would be conducted, we prefer to dilute the sample with residual inert gas by about two-thirds, thereby to take a sample containing only 45 mg of water into the canister, so that the sample will remain in the vapor state and be free of condensation at temperatures down to 60° F. To accomplish this result, we prefer to evacuate the canister to about 10 inches of mercury, i.e., one-third the vacuum at which a 100 percent sample would be obtained. While these are the proportions we presently prefer, it will be appreciated that the percent dilution can be selected as desired to afford a sample that is in the vapor state at a selected testing temperature.

An internal standard may be introduced into the canister either before or after the sample is taken. If inserted before, the canister can be used only for a single sampling purpose and it is preferable therefore to inject the standard after the sample is taken, at the time of testing thereof. The internal standard is selected to be non-reactive with and yet to have chromatographic characteristics similar to or compatible with those of the suspect constituent of the sampled gas. The precise amount of the standard is determined in known manner by comparative analysis of the calibration curves of the standard and the suspect constituent on the gas chromatograph to be used for testing the sample. Usually, the amount of internal standard required is extremely small, and does not upset the pre-existing balance in the sample canister. For analysis of breath alcohol, a suitable internal standard is methyl ethyl ketone, and the precise amount to be used is determined in known manner from the calibration curves of methyl ethyl ketone and ethyl alcohol on the particular gas chromatograph to be used, as taken in conjunction with normal ranges of breath alcohol in humans and/or local laws defining drunkenness in terms of breath or blood alcohol. While variable under differing conditions, the amount of methyl ethyl ketone required as an internal standard for the above described preferred embodiment of a breath sampling canister comprises a fraction of a micro liter.

To afford particular facility for the taking of human breath samples, the inlet 20 of the canister 10 is fitted with the tube 14 through which the sample is taken. As shown in FIG. 1, the tube may have an end fitting 22 which may contain the enlarged end portion 16, or the tube may be of one piece construction. In addition, the tube may have a secondary concentric tube 24 of smaller diameter disposed therein, with the outermost end adjacent to the fitting 22 passing through a seal 26 between the outer tube and inner tube, and the other end being juxtaposed to the inlet fitting 20.

The tube 14 is preferably composed of a flexible plastic and has a longitudinal slit 28 therein, preferably of a length no less than 3.75 cm and optimally in the order of 5 cm. The slit 28 serves as a one-way exhaust valve which, relative to atmospheric pressure, opens with increased pressure in the tube 14 and closes with decreased pressure when vacuum is applied from the canister 10. The slit 28 is more economical than, and eliminates the need for a separate exhaust valve component.

In order to use the device shown in FIG. 1, the person to be tested is requested to insert the enlarged end 16 of the tube 14 into his mouth and to engage said end with the teeth or lips, sealing the lips about the tube 14, and then to exhale through the tube. The initial volume of breath exhaled is exhausted through the slit 28, and near the end of exhalation, the operator depresses the valve 18 on the canister, which causes the slit to close and air to be drawn directly from the lungs of the person being tested until the canister reaches approximately atmospheric pressure. The use of the inner tube 24 reduces the total volume within the tube 15, and aids in isolating the valve slit 28 from the canister and providing substantially direct communication between the suspect and the canister during the taking of the sample.

Figure 2:
FIG. 2 is an elevational view of a second form of valved sample tube.

However, if desired the tube 24 and the seal 26 may be omitted to provide a more simplified tube assembly 14a, as shown in FIG. 2.

Figure 3:
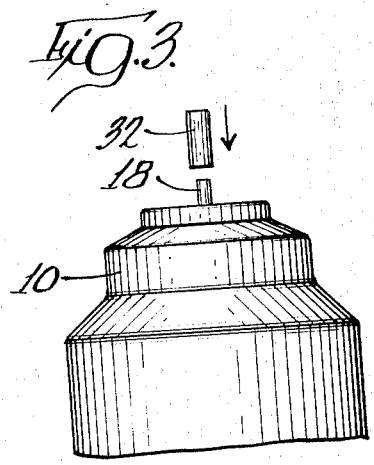
FIG. 3 is a fragmentary view of a canister with the valve button removed and additionally showing one mode of securing the valve stem against tampering.
Figure 4:
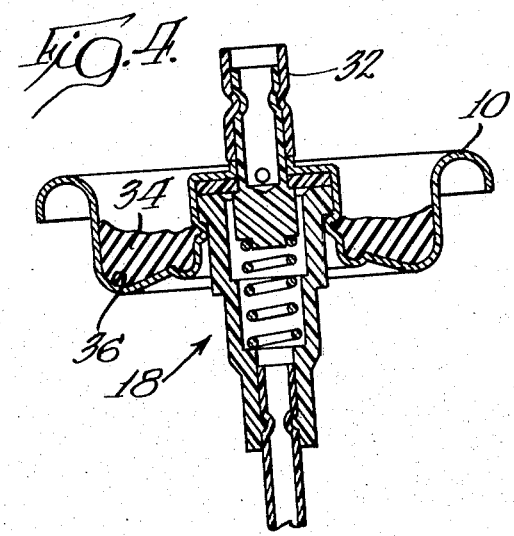
FIG. 4 is a fragmentary vertical section of the top of the canister and the valve, illustrating the valve stem securing means and the self-sealing material through which the canister is tapped.

After the breath sample has been obtained, a specimen may be immediately withdrawn for testing in the manner hereafter described, or it may be necessary to store or ship the canister before the necessary analysis can be conducted. In the latter event, it is important to maintain the integrity of the contained sample during handling and transporting by preventing tampering with the container. To achieve this end, the container itself is completely sealed and impermeable except through the valve 18. To prevent manipulation of the valve after the sample has been taken, the valve fitting 12 and the tube assembly 14 are removed (and discarded), thereby exposing the stem of the valve 18 extending vertically from the top of the canister (FIGS. 3 and 4). The valve stem is thereupon secured against movement by crimping onto it a short length of hollow tubing 32, composed of metal or the like. The tube 32, which has a slightly larger inner diameter than the outer diameter of the stem, is telescoped over the stem, pressed down against the top wall of the canister and then crimped, as shown in FIG. 4, so as to prevent accidental or intentional depression of the stem, thereby preventing entry into the canister through the valve 18.

Means are also provided to accommodate hypodermic injection of an internal standard into and extraction of testing specimens from the canister without contamination, while at the same time providing a visual indication that a test specimen has been withdrawn. As shown in FIG. 4, the top wall of the canister 10 is formed to provide an annular recess 36 around the valve 18, and this recess is filled, partially or fully, with a self-sealing material 34, such as RTV-silicone rubber, i.e., a silicone rubber composition that vulcanizes at room temperature. While a predrilled hole could be provided in the recessed portion of the top wall of the canister, sealed by the material 34, to accommodate passage of a hypodermic needle, it is preferable that the wall initially be imperforate to insure against tampering and to provide the test analyst with a clear indication of that fact. Consequently, it is necessary for the analyst to pierce the top wall through the sealant with a punch or similar instrument to provide an access hole, which is immediately sealed by the material 34, and thereby also providing a visual indication of opening. An internal standard, if used, may then be hypodermically injected into the canister through the sealant and the hole. Likewise, gas samples may be withdrawn by inserting the needle of a syringe through the sealant and the punched opening and withdrawing a measured volume of gas.

The amount of the suspect constituent present in the sample may then be determined quantitatively by a variety of known methods, preferably gas chromatography.

While a primary use of the sampler is by law enforcement agencies in testing for breath alcohol in human beings, the sampling apparatus and method are also used by environmentalists in testing for the effects on humans of various atmospheres. For example, a sample of the atmosphere in a place of work may be taken in a first sample can and a sample of the alveolar air of a person working in that atmosphere may be taken in a second sample can to determine the amount of a selected contaminant in the atmosphere, the amount of the contaminant in the deep lung air of the worker and the correlation therebetween. Also, the sampling and testing technique is used in pollution testing and control, and in various industrial and commercial enterprises. For example, the technique may be used in testing the gas over fermentation processes, and may be used for testing, analysis and record keeping in the production of industrial and medical gases.

Thus, while we have described what we believe to be the best mode of carrying out our invention, it will be apparent to those skilled in the art that variations, modifications and rearrangements may be made therein without departing from the scope of the invention, as defined by the appended claims.

We claim:

1. In a gas sampler comprising an evacuated canister having a valved inlet and a gas sampling tube connected to said inlet having a one-way exhaust valve, the improvement wherein the gas sampling tube is composed of flexible material and has a longitudinal slit therein comprising the one way exhaust valve.

2. The sampler of claim 1 wherein the length of said slit is at least about 3.75 cm.

3. The sampler of claim 1 including a second tube within said sampling tube sealed thereto at a location near the free end of said sampling tube and extending past said slit to adjacent said inlet.

4. In a gas sampler comprising an evacuated canister having a valved inlet and a gas sampling tube connected to said inlet having a one-way exhaust valve, the improvement wherein the canister is evacuated to a vacuum pressure of no more than about 15 inches of mercury.

5. The sampler of claim 4 wherein said vacuum pressure is in the order of about 10 inches of mercury.

6. A gas sampler comprising an evacuated canister having a valved inlet in the top thereof accommodating vacuum induction of of a gas to be sampled, said canister having a recessed wall portion encircling said inlet, and a self-sealing material filling the recess in said wall portion, said material accommodating hypodermic extraction of gas from said canister without contamination through a hole in said recess sealed by said material.

7. The sampler of claim 6 wherein the recessed wall portion is initially imperferate and the hole therein is made through the sealing material only after gas has been inducted into the canister.

8. The sampler of claim 6, said valved inlet including a valve stem extending from said canister, and means for securing said stem against movement relative to said canister.

9. A method of making a gas sampler comprising the steps of purging air from a canister, filling the canister with an inert gas, partially evacuating the canister to provide a subatmospheric pressure therein and a residual atmosphere of inert gas only providing the canister with a valved inlet accommodating vacuum induction of a gas to be sampled, and introducing into said canister an internal standard in liquid form correlated to the gas to be sampled, the initial partial evacuation of said canister being such as to establish a degree of vacuum therein correlated to the vapor saturation curves of both the gas to be sampled and the standard for retaining the sample and standard in a homogeneous vapor state within the canister at the temperature at which the sample is taken and the temperature at which the homogeneous vapor is to be analyzed.

10. In a method of taking and analyzing samples of a gas containing an unknown amount of a liquid component in vapor state, comprising the steps of sucking a sample of the gas into an evacuated canister and closing the canister to trap the sample therein, introducing into said canister a known amount of a known liquid standard correlated to the liquid component of the gas in the canister, providing within said canister a volume of inert gas sufficient to dilute and maintain the liquid component of said sample and said standard entirely in a homogeneous vapor state, extracting from the canister a fixed volume specimen containing vapor components of both the standard and the liquid component of the gas, and testing the specimen for the proportional relationship between the known standard and said liquid component of the gas to determine quantitatively the amount of said liquid component in the specimen.

11. The gas sampler of claim 4 wherein said canister contains a measured amount of methyl ethyl ketone as an internal standard.

* * * * *

UNITED STATES PATENT OFFICE
CERTIFICATE OF CORRECTION

PATENT NO. : 3,817,108
DATED : June 18, 1974
INVENTOR(S) : Andrew H. Principe & Emmett P. Glynn It is certified that error appears in the above-identified patent and that said Letters Patent are hereby corrected as shown below:

Column 4, line 2, "135" should read --13.5--;

Column 4, line 2, "45" should read --4.5--;

Column 4, line 8, "45" should read --4.5--.

Signed and Sealed this

Twenty-sixth Day of April 1977

[SEAL]

Attest:

RUTH C. MASON
Attesting Officer

C. MARSHALL DANN
Commissioner of Patents and Trademarks